United States Patent
Mourton et al.

(10) Patent No.: US 11,749,136 B2
(45) Date of Patent: Sep. 5, 2023

(54) SELF-CONTAINED MULTIPURPOSE MEDICAL TRAINING SYSTEM AND COMPONENTS

(71) Applicant: MOCHTECH, LLC, St. Louis, MO (US)

(72) Inventors: Robb Mourton, Grover, MO (US); Douglas Churovich, St. Louis, MO (US)

(73) Assignee: Mochtech, LLC, Grover, MO (US)

( * ) Notice: Subject to any disclaimer, the term of this patent is extended or adjusted under 35 U.S.C. 154(b) by 225 days.

(21) Appl. No.: 17/169,151

(22) Filed: Feb. 5, 2021

(65) Prior Publication Data

US 2021/0183267 A1 Jun. 17, 2021

Related U.S. Application Data

(62) Division of application No. 16/046,724, filed on Jul. 26, 2018, now Pat. No. 10,943,507.

(60) Provisional application No. 62/537,841, filed on Jul. 27, 2017.

(51) Int. Cl.
   *G09B 23/30* (2006.01)
   *G09B 23/28* (2006.01)
   *G09B 9/00* (2006.01)

(52) U.S. Cl.
   CPC .............. *G09B 23/285* (2013.01); *G09B 9/00* (2013.01); *G09B 23/303* (2013.01)

(58) Field of Classification Search
   CPC ....... G09B 23/28; G09B 23/285; G09B 23/30
   See application file for complete search history.

(56) References Cited

U.S. PATENT DOCUMENTS

| | | | | |
|---|---|---|---|---|
| 5,947,743 A * | 9/1999 | Hasson | ................ | G09B 23/286 434/262 |
| 6,336,812 B1 * | 1/2002 | Cooper | ................ | G09B 23/285 434/262 |
| 8,403,676 B2 * | 3/2013 | Frassica | ................. | G09B 23/30 434/267 |
| 9,017,080 B1 * | 4/2015 | Placik | .................. | G09B 23/285 434/269 |
| 9,959,786 B2 * | 5/2018 | Breslin | ................ | G09B 23/285 |
| 10,796,606 B2 * | 10/2020 | Felsinger | ................ | B29C 39/38 |
| 2008/0138780 A1 * | 6/2008 | Eggert | .................... | G09B 23/28 434/266 |
| 2009/0298034 A1 * | 12/2009 | Parry | ...................... | G09B 23/30 434/274 |
| 2014/0030682 A1 * | 1/2014 | Thilenius | ............... | G09B 23/30 434/219 |
| 2014/0272878 A1 * | 9/2014 | Shim | ........................ | G09B 9/00 434/272 |

* cited by examiner

*Primary Examiner* — Kurt Fernstrom
(74) *Attorney, Agent, or Firm* — Churovich Law, LLC

(57) ABSTRACT

A synthetic skin patch for a medical needle insertion training device. The training device has a training region, at least one synthetic vein in the training region, and a plurality of fastening structures positioned about the training region. The skin patch comprises an elastic, substantially flat central body, and a plurality of connectors positioned about the perimeter of the central body. The connectors positionally match and mate with the fastening structures on the training device to secure the skin patch to the training device over the training region.

18 Claims, 6 Drawing Sheets

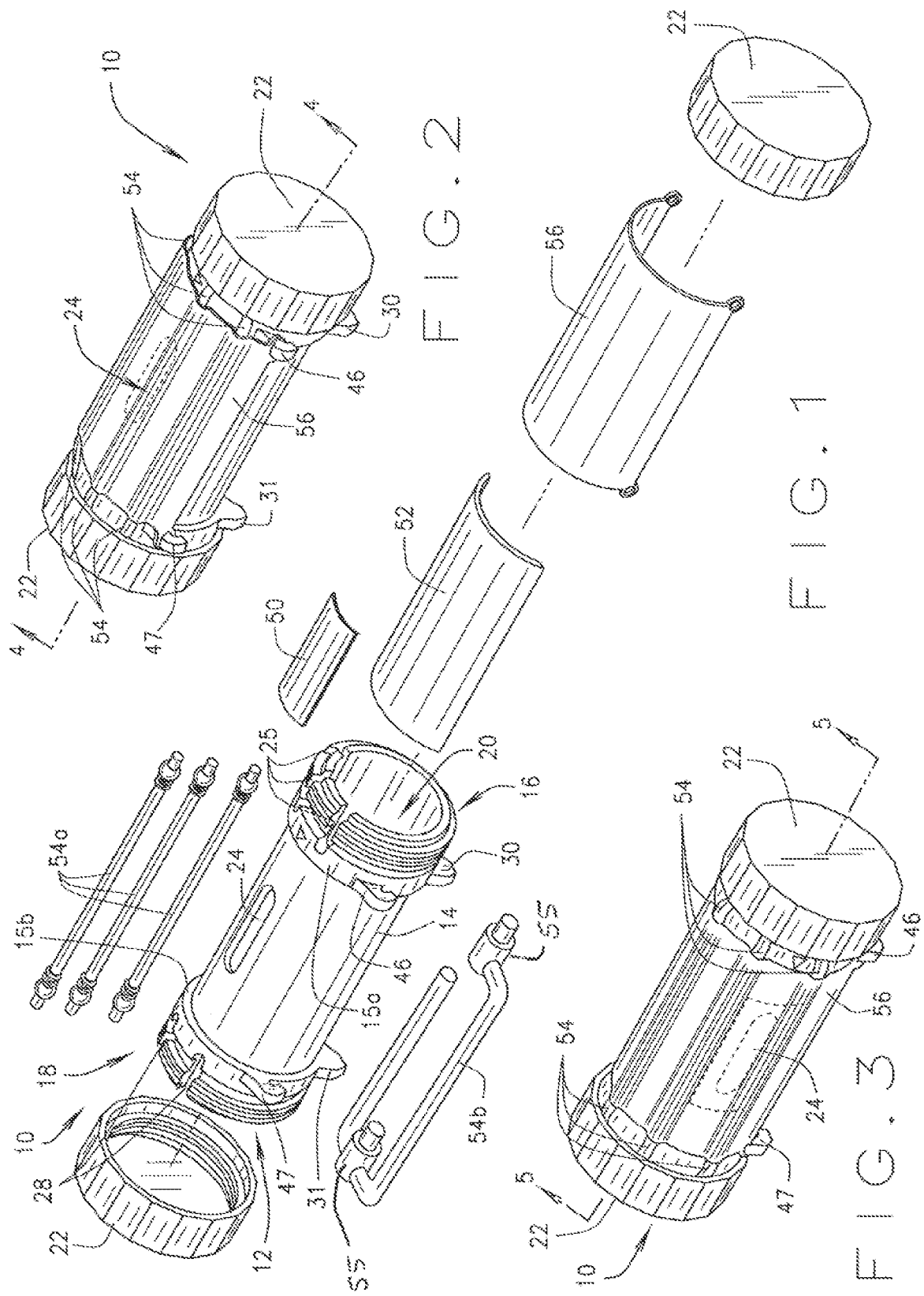

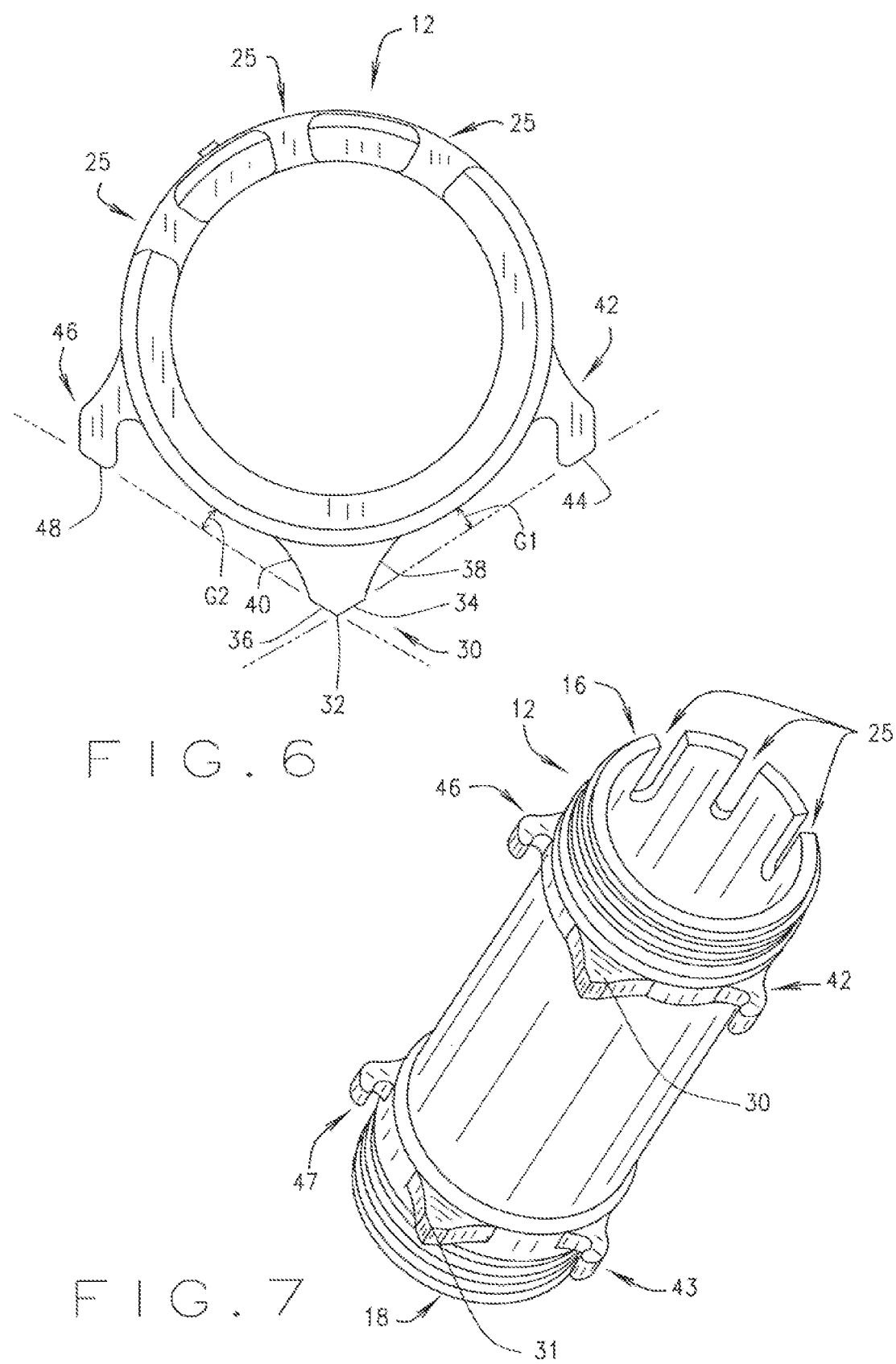

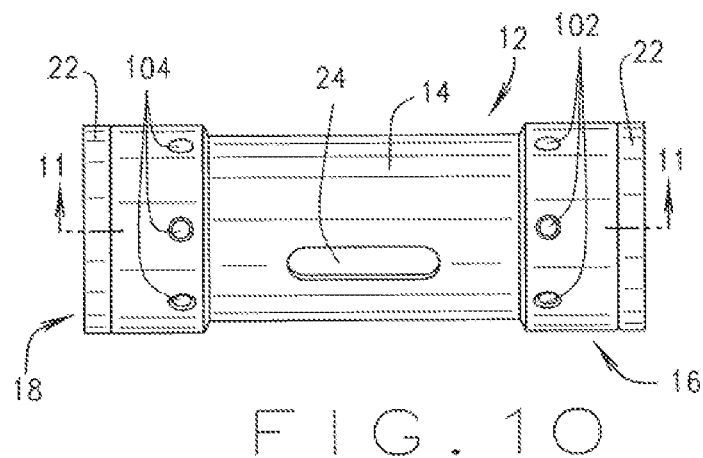
FIG. 10
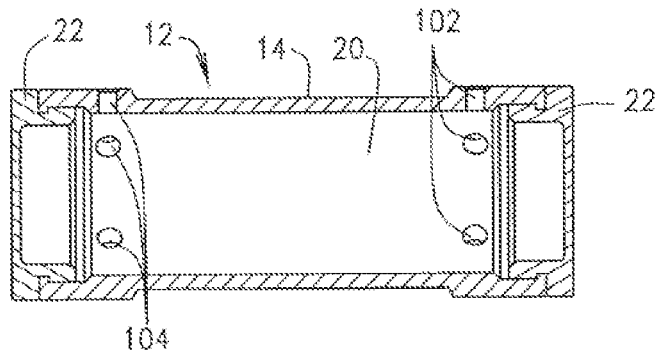
FIG. 11
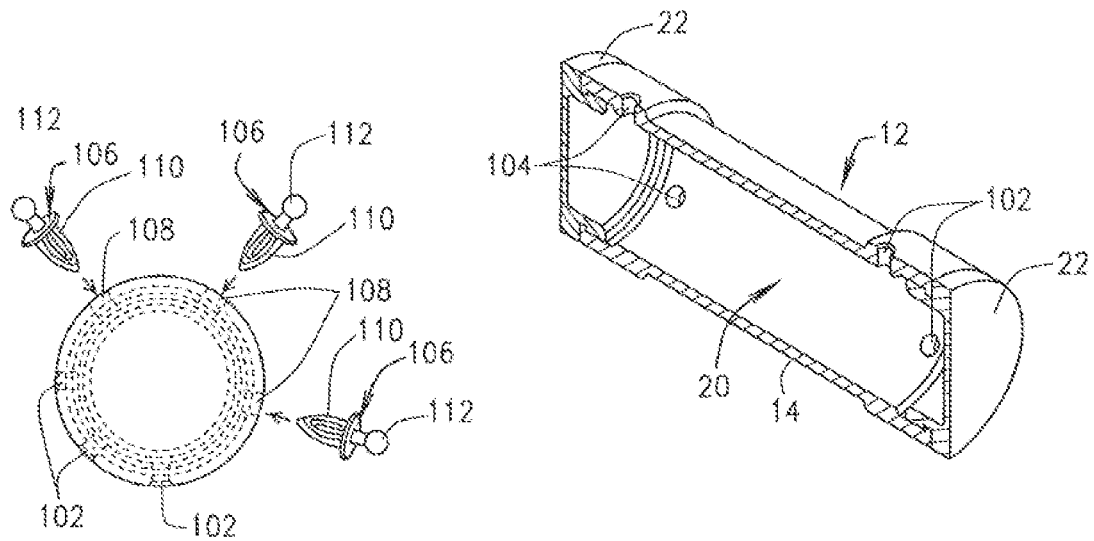
FIG. 13
FIG. 12

SELF-CONTAINED MULTIPURPOSE MEDICAL TRAINING SYSTEM AND COMPONENTS

CROSS REFERENCE TO RELATED APPLICATIONS

This application is related to, and claims priority from, co-pending U.S. patent application Ser. No. 16/046,724 filed on Jul. 26, 2018 which claims priority from U.S. provisional application 62/537,841 filed Jul. 27, 2017 which is incorporated herein by reference.

STATEMENT REGARDING FEDERALLY SPONSORED RESEARCH OR DEVELOPMENT

Not Applicable.

FIELD

The present teachings generally relate to medical training devices, and more particularly to novel improvements to a self-contained multipurpose medical training system and associated components for the same.

BACKGROUND

The statements in this section merely provide background information related to the present disclosure and may not constitute prior art.

Learning the proper skill and precision for safely and effectively inserting a catheter needle, particularly intravenously or for decompression purposes, is a difficult and tedious process. Such training becomes more complex and complicated when the training must occur under field conditions, i.e., at locations other than established medical training facilities such as temporary and/or mobile military medical facilities or bases.

Unfortunately, traditional medical needle insertion training devices are designed for classroom settings. They typically include a replicated human body part (e.g., a leg, arm or torso), and focus on anatomical correctness—not convenience. Most require support components (e.g., pumps and monitors) that link to the anatomical component with tubes and wires. Moreover, all of the training components require separate storage—even the needles (a/k/a "Sharps"). Hence, traditional training devices are large and unwieldy, not very durable, and not very portable. Up until recently, the prevailing attitude in the medical community had been that the student would learn and practice needle insertion techniques at an institution or facility supplied with a traditional training device. As a consequence, training, certification and recertification efforts have been traditionally focused on classroom training, with few options for home or other out-of-classroom practice.

In recent years, a few "portable" or "personal" devices have been introduced, including for example the self-contained needle insertion training system disclosed in U.S. Pat. No. 8,556,634 (the "'634 patent"). These devices, and in particular the device disclosed and claimed in the '634 patent (the "'634 Trainer"), provide a readily available compact training platform for personal use that can be accessed and utilized at virtually any time and place. Although the '634 Trainer has substantial benefits over other needle insertion training devices, it has been found that the device would benefit from improvements.

In particular, the preferred embodiment of the '634 Trainer is elongated and substantially tubular. This can at times result in an unstable practice platform in that the device may shift or roll during needle insertion training. This potential problem can be moderated by positioning of the device and/or the particular grip applied to the device during training or practice procedures. For example, the device can be held firmly at one end with one hand while using the other hand to conduct the needle insertions. Alternately, the device can be placed in the user's lap or on a cushion or other similar surface to hold the device in place during training. However, it would be desirable to have a configuration for the '634 Trainer that would be relatively stable, without rolling, and that would not require such external constraints to impose such stability.

Further, the '634 Trainer is designed to provide at least two different practice areas upon which to train—e.g., one for intravenous insertions and one for chest needle decompression insertions. Although these training areas have a somewhat curved topography because they run along the outer surface of a tubular body, they nonetheless provide an overall relatively flat upward facing surface for the practice of needle insertion. Yet, because each of the practice areas is oriented on a different plane relative to each other (and relative to the central axis of the trainer), the trainer must be rotated or oriented for use such that the desired training area is facing upward. It would therefore be desirable for the trainer to be configured such that the trainer will be stable when placed upon a relatively flat surface when either of the practice areas is positioned in an upward facing orientation.

In addition, in the '634 Trainer, the synthetic skin is disclosed as a "jacket" that slips over the synthetic or simulated blood vessels and underlying flesh pad on the outer surface of the body. While this is a very functional design, during use the synthetic skin must frequently be replaced, and the jacket or tubular design of the simulated skin in the '634 Trainer can require undue time to replace. This same problem exists for other needle insertion training devices, where the synthetic skin requires excessive time to replace. It would therefore be desirable to have a synthetic skin component designed for needle insertion training devices that is readily and rapidly replaceable. It would further be desirable for the synthetic skin to integrate in some manner with the body of the training device in order to streamline and improve the efficiency of the product design and function.

Further, in certain embodiments, applicant's trainer is configured for the threading of simulated blood vessels through orifices in the body of the trainer with the use of clips on the interior of the trainer to secure the simulated blood vessels in place on the outer surface of the trainer. While functional, the threading of the simulated blood vessels can be somewhat difficult and time consuming. It would therefore be desirable for the trainer to be configured to enable a less demanding method to thread and secure the simulated blood vessels for attachment to the outer surface of the trainer.

In yet other embodiments, applicant's trainer is configured to accommodate the attachment of simulated blood vessel strips or segments on the outer surface of the device. The disclosed configurations require that each end of each simulated blood vessel strip or segment be secured to protrusions on each end of the outer surface of the trainer. While functional, it has since been learned that this configuration lends itself to the potential for inadvertent dislodging of the simulated blood vessel strips or segments from the protrusions. It would therefore be desirable for the trainer to be configured to secure the simulated blood vessel strips or segments to the outer surface of the trainer in a manner that would minimize the potential for the inadvertent dislodging of the simulated blood vessel strips or segments from the trainer.

DRAWINGS

The drawings described herein are for illustration purposes only and are not intended to limit the scope of the present teachings in any way.

FIG. 1 is an exploded isometric view of the body, endcaps and other various components of a first embodiment of a multipurpose medical training system in accordance with and incorporating various features of the present disclosure.

FIG. 2 is a perspective view of the multipurpose medical training system of FIG. 1 showing the decompression slot as a phantom image, with the body resting on a first set of feet to stably position the system with the decompression slot facing upward.

FIG. 3 is a perspective view of the multipurpose medical training system of FIG. 1 showing the decompression slot as a phantom image, with the body resting on a second set of feet to stably position the system with a single training simulated blood vessel facing upward and the decompression slot facing to the side.

FIG. 6 is an end view of the body of the multipurpose medical training system of FIG. 1.

FIG. 7 is a perspective view of the underside of the body of the multipurpose medical training system of FIG. 1.

FIG. 10 is a side or plan view of a second embodiment of the body and endcaps of a multipurpose medical training system in accordance with and incorporating various features of the present disclosure, and showing a sectional line 11-11.

FIG. 11 is a lateral cross-sectional view of the body and endcaps of the multipurpose medical training system of FIG. 10 along the sectional line 11-11.

FIG. 12 is a perspective view of the lateral cross-sectional view in FIG. 11 of the body and endcaps of the multipurpose medical training system of FIG. 10.

FIG. 13 is an end view of the body of multipurpose medical training system of FIG. 10, showing representative legs oriented for insertion into corresponding orifices in the body.

Corresponding reference numerals indicate corresponding parts throughout the several views of drawings.

DETAILED DESCRIPTION

Figure 4:
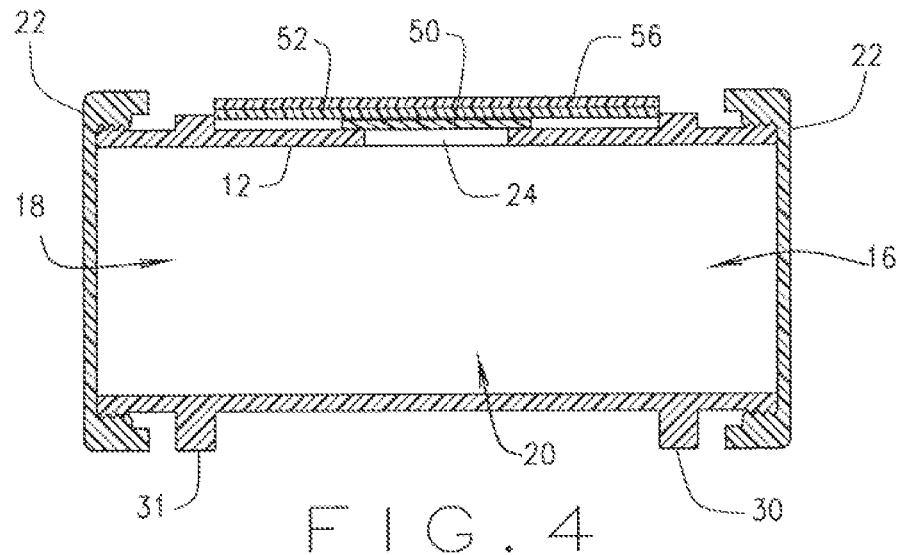
FIG. 4 is a cross-sectional plan view of the multipurpose medical training system of FIG. 1, sectioned along the centerline of the body and endcaps with the decompression aperture oriented upward, showing various representative needle insertion training components stored within the body of the training system.

The following description is merely exemplary in nature and is in no way intended to limit the present teachings, application, or uses. Throughout this specification, like reference numerals will be used to refer to like elements.

Referring to FIG. 1, the present disclosure provides an improved self-contained catheter intravenous needle insertion training system ("ITS") 10 that is structured and operable to provide an instrument or tool for users to practice various needle insertion techniques.

Generally, the improved ITS 10 provides expedient and precise skills training for intravenous ("IV") and needle decompression education. The improved ITS 10 is structured and functional to be a total self-contained training device, whereby everything that is needed to conduct critical hands on lifesaving IV and needle decompression training can be stored within the unit, although various components are at times attached to the exterior surface of the device to enable practice and training functionality. It is envisioned that the improved ITS 10 can be used, for example, in the field by the U.S. military to instruct critical combat lifesaver skills to soldiers and host nation forces, as well as providing an excellent training tool for civilians and as a tool in, for example, the classroom setting or away from the classroom.

Referring now to FIGS. 1, 2 and 3, a first embodiment of the improved ITS 10 includes a hollow tubular body 12 of approximately 6¼ inch length by approximately 2 inch outer diameter, and having at least one sidewall 14 of approximately ⅛ inch thickness, a first externally threaded open end 16 having an approximate length of one inch, an opposing second externally threaded open end 18 having an approximate length of one inch, and an interior cavity 20 formed by the sidewall 14 and the open ends 16 and 18. Of course, the improved ITS 10 could be configured with a single open end with an opposing closed end. That is, in various embodiments, the body can have a square, rectangular, triangular, etc., cross-section, such that the body 12 includes a plurality of sidewalls 14, or in various other embodiments, the body can have a circular, oval, elliptical, etc., cross-section, such that the body 12 includes one or more circumferential sidewalls 14. However, although the body 12 can include more than one sidewall 14 and/or more than one cavity 20, for clarity and simplicity, the one or more sidewall(s) 14 will be referred to herein in the singular, e.g., sidewall 14 with a single cavity 20. The outer diameter of the sidewall 14 is slightly less than the outer diameter of the open end 16 and open end 18. Consequently, a small lip 15a of approximately ⅛ inch width is formed at the junction between the sidewall 14 and the open end 16, and a matching small lip 15b of approximately ⅛ inch width is formed at the junction between the sidewall 14 and the open end 18.

The improved ITS 10 additionally includes two closure devices or endcaps 22 that are structured and operable with interior threads to engage or mate with the exterior treads of the first and second open ends 16 and 18 as shown. When secured to the body 12, the endcaps 22 thereby substantially close the open ends 16 and 18 of the body 12 to close off the interior cavity 20 such that at least one of a variety of components, to be used in association with the improved ITS 10, can be removably stored within the interior cavity 20. Such components can be any device, mechanism, substance, applicator, accessory, component, tablet, capsule, caplet, etc. to be used in association with the improved ITS 10, including, e.g., a hypodermic syringe and associated needle assemblies, an intravenous catheter device and associated needle assembly, decompression device and associated needle assembly for evacuating air from a wound, alcohol or iodine swaps, scissors, a knife, tweezers, suture implements, simulated blood vessels, tissue and skin, synthetic blood, various clips, and a syringe and stopcock or valve, etc. (collectively, the "Storable Trainer Components").

In various embodiments, the improved ITS 10 can include an annular collar that is fixed to the body 12 at a first end to configure one of the open ends 16 or 18 to be matable with an endcap 22. In other embodiments, the open ends 16 and 18 can be configured to removably mate with the endcaps 22 without an annular collar. Further, while the endcaps 22 are depicted in FIGS. 1-3 as caps with lateral ridges on their outer surfaces that are used as a grip surface to effectuate the turning of the endcap 22 to open and close the improved ITS 10, other closure configurations will provide the same function. For example, the endcap 22 can be configured with a knurled outer surface in place of the lateral ridges to provide a grip surface. Likewise, the endcaps 22 may alternatively be configured, for example, with tabs, lugs or other protrusions to provide a grip.

Of course, the endcaps 22 can be any device structured and operable to allow the open ends 16 and 18 of the body 12 to be securely covered when it is desired to close off the interior cavity 20, and be readily removed from, or disengaged with, the respective open end 16 or 18 to allow access to the interior cavity 20. That is, the endcap 22 can be any device structured and operable to allow the improved ITS 10 to be opened and closed as desired to respectively allow or prevent access to the interior cavity 20. For example, in various embodiments, the endcap 22 can be a plug that is structured and operable to threadingly or frictionally engage the body 12 at or near the open end 16. Alternatively, in various embodiments, the endcap 22 can be a lid, door or any other structure, device or mechanism that pivotally, rotatingly, hingedly or removably connect to the body 12 at or near the open end 16 such that the structure, device or mechanism can be secured or latched in a closed position, via any suitable latching device, and pivotally, rotatingly or hingedly moved to an open position upon release or uncoupling of the securing or latching device or mechanism.

Hence, any one or more of the Storable Trainer Components can be placed in the interior cavity 20 and stored therein by placing the endcaps 22 in a closed position, wherein the endcaps 22 securely engage the body 12 at or near the open ends 16 and 18. Subsequently, the stored Storable Trainer Components can be removed from the interior cavity 20 by placing one or more of the endcaps 22 in an open position, wherein the endcap 22 is disengaged from one of the body open ends 16 or 18, i.e., removed from or moved away from that open end, thereby allowing access to the interior cavity 20.

Referring again to FIGS. 1-3, and FIG. 6, in various embodiments, the improved ITS 10 further includes a needle decompression training orifice 24 extending through the sidewall 14. The needle decompression training orifice 24 is structured and functional to allow a user to practice inserting the catheterized decompression needle into the chest of a patient to evacuate air from the patient's chest cavity, as described further below. The orifice 24 is formed in the shape of an elongated slot with rounded ends, and runs laterally on the side of the body 12. The orifice 24 is centered lengthwise between the first and second open ends 16 and 18, with a length of approximately two inches and a width of approximately ⅜ inch. The outer edges of the orifice 24 are rounded to provide a more anatomically correct opening and to promote the advance of the decompression needle into the orifice 24 during training.

Three open-ended, approximately ¼ inch wide, uniform slots 25 are formed in the open end 16 and extend entirely through the sidewall 14. The slots 25 are all the same size and shape, and extend parallel to one another laterally inward a distance of approximately one inch from the rim of the open end 16 toward the middle of the body 12. The inner ends and outer edges of each of the slots 25 are rounded to eliminate sharp edges.

Similarly, three open-ended, approximately ⅜" wide, uniform slots 28 are formed in the open end 18 and extend entirely through the sidewall 14. The slots 28 are all the same size and shape, and extend parallel to one another laterally inward a distance of approximately one inch from the rim of the open end 16 toward the middle of the body 12. The inner ends and outer edges of each of the slots 28 are rounded to eliminate sharp edges.

Each of the open ends 16 and 18 also has a set of three bases in the form of legs that protrude radially from the body 12 just inside the threads of said open ends. Referring to FIG. 4, it can be seen that a first leg 30 extends from the body 12 substantially opposite the middle of the three slots 25 proximate the open end 16. The first leg 30 extends approximately ½ inch radially from the outer surface of the sidewall 14 to a tip 32. Flat edges 34 and 36 descend in mirror fashion from each side of the tip 32 approximately ¼ inch at an angle of approximately 45 degrees, while concave arcs 38 and 40 extend approximately ⅜ inch from the body 12 upward to join the edges 34 and 36, respectively, and form the leg 30.

A second leg 42 extends outward from the body 12 at an orientation of approximately 40 degrees away from the first leg 30. The second leg 42 extends approximately ½ inch radially from the outer surface of the sidewall 14 to form a flat edge 44 that is parallel to the flat edge 34 of the first leg 30.

Similarly, a third leg 46 extends outward from the body 12 at an orientation of approximately 40 degrees away from the first leg 30 opposite the second leg 42. The third leg 46 extends approximately ½ inch radially from the outer surface of the sidewall 14 to form a flat edge 48 that is parallel to the flat edge 36 of the first leg 30.

Figure 5:
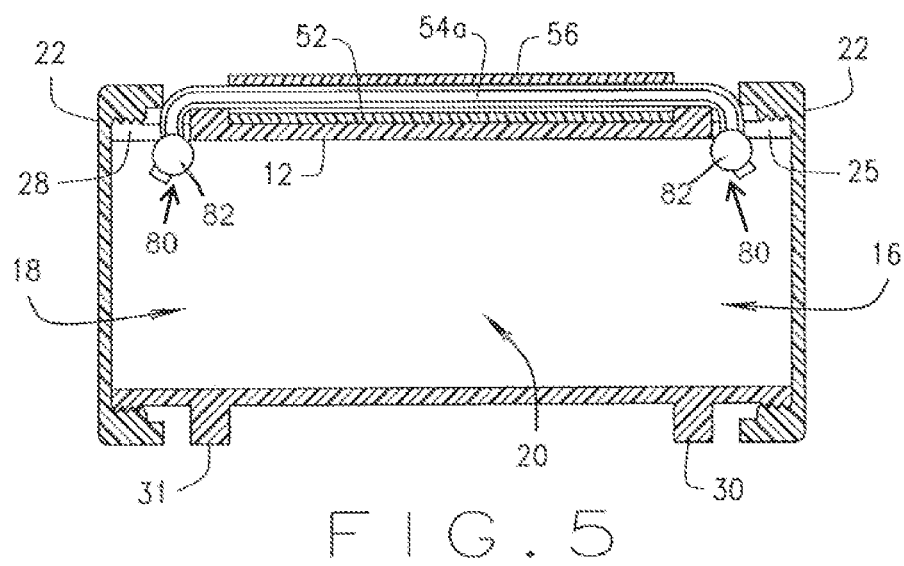
FIG. 5 is a cross-sectional plan view of the multipurpose medical training system of FIG. 1, sectioned along the centerline of the body and endcaps with one of the simulated blood vessels oriented along the top of the outer surface of the system, showing various representative needle insertion training components stored within the body of the training system.
Figure 8:
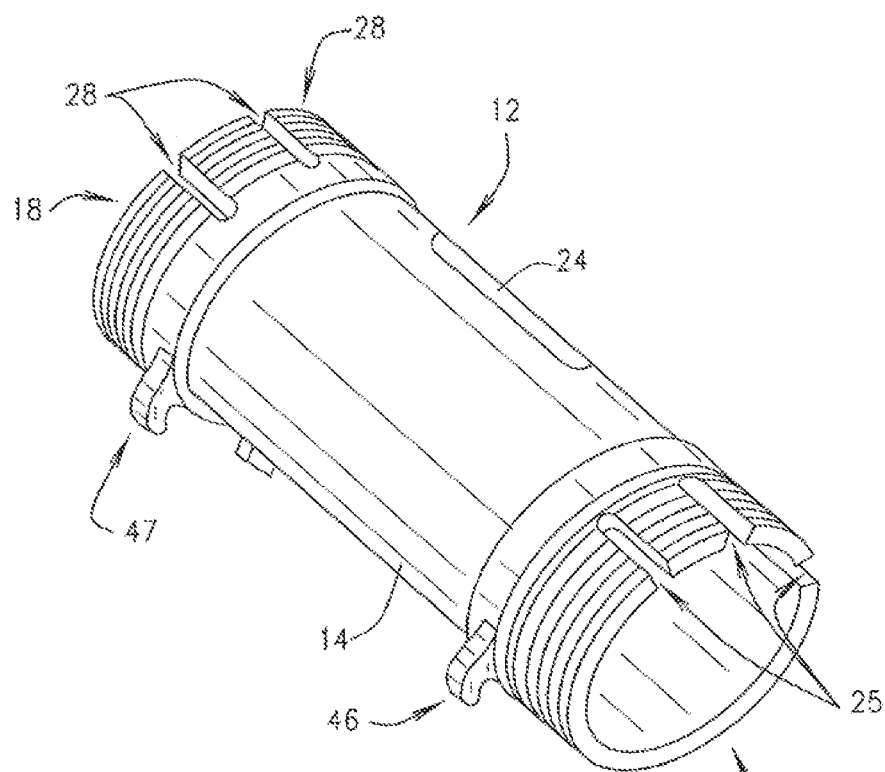
FIG. 8 is a perspective view of the body of the multipurpose medical training system of FIG. 1 oriented with the decompression partially visible.
Figure 9:
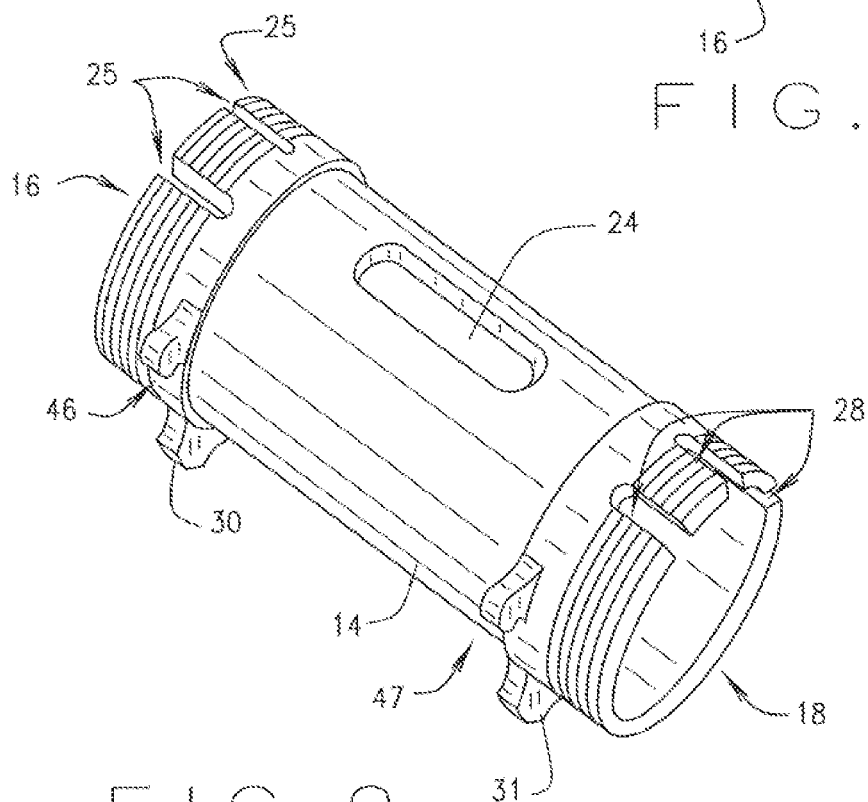
FIG. 9 is a perspective view of the body of the multipurpose medical training system of FIG. 1 oriented with the decompression slot fully visible.
Figure 14:
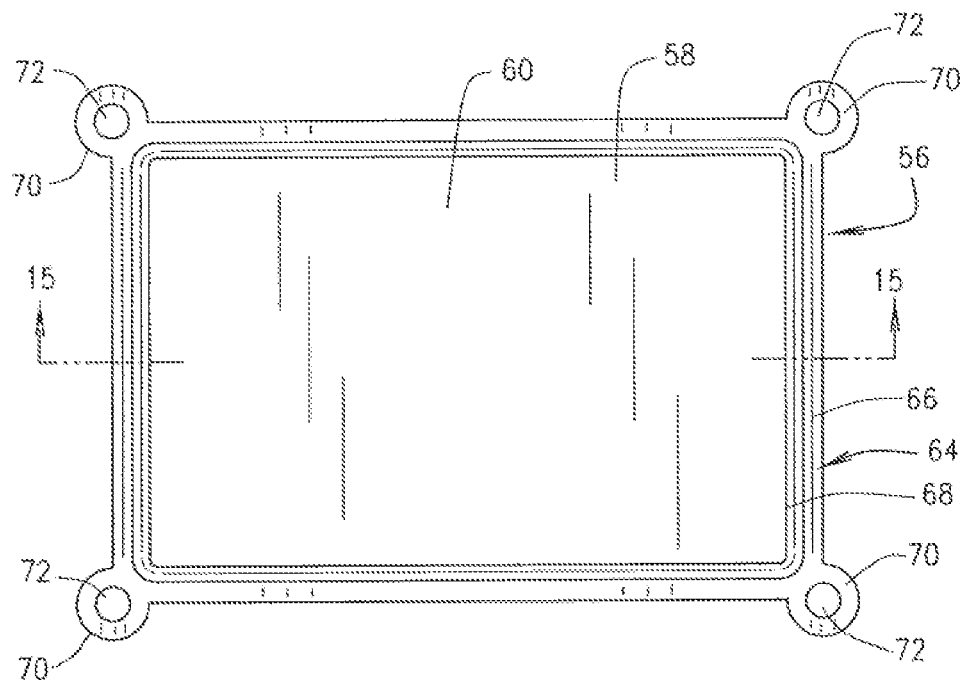
FIG. 14 is a top view of a synthetic skin patch for use with multipurpose medical training systems of including the system of the present disclosure, in accordance with various embodiments of the present disclosure, and showing a sectional line 15-15.
Figure 15:
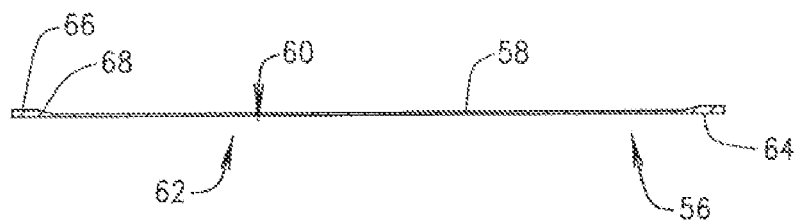
FIG. 15 is a cross-sectional view of the synthetic skin patch of FIG. 14 along sectional line 15-15.

All of the legs 30, 42 and 46 are flat and coplanar on both lateral sides and approximately ¼ inch wide. Moreover, in order to enable the legs to function without interference from the body 12 when the ITS 10 is positioned on a substantially flat surface, a gap G1 of approximately ⅛ inch exists between the outer surface of the sidewall 14 and the line defined by the flat edge 44 of the second leg 42 and the flat edge 34 of the first leg 30, and a gap G2 of approximately ⅛ inch exists between the outer surface of the sidewall 14 and the line defined by the flat edge 48 of the third leg 46 to the flat edge 36 of the first leg 30. Of course, these gaps G1 and G2 can vary so long as the legs extend far enough from the body 12 to create a separation or a flush fit between the lines and the body. Referring to the FIGS. 5-7, it can be seen that the body 12 has a second set of legs 31, 43 and 47, proximate the open end 18 that mirror the legs 30, 42 and 46 proximate the open end 16.

As can be appreciated, the unique configuration of the legs 30, 31, 42, 43, 46 and 47, enables the user to selectively orient either of the two training regions facing upward when the ITS 10 on a relatively flat surface, and rapidly switch to the other training region merely by rotating the ITS 10 so that it rests on a different four of the six legs. That is, when the legs 30, 31, 42 and 43 are positioned on a relatively flat surface, the needle decompression orifice 24 and its associated training region face upward and the ITS 10 is in a first orientation ready for decompression needle insertion training use. By simply rotating the ITS 10 so that the legs 30, 31, 46 and 47 are resting on the same flat surface, a single simulated blood vessel 54 not adjacent the decompression orifice 24 is facing upward along with its associated training region and the ITS 10 is in a second orientation ready for IV needle insertion training use. Notably, the ITS 10 shares the legs 30 and 31 between the first and second training orientations.

Referring again to FIGS. 1-3, in various implementations, a clavicle simulation pad 50 is positioned on the outer surface of the hollow body atop the needle depression training orifice 24. The clavicle simulation pad 50 is structured to simulate the characteristics of human clavicle tissue. In the embodiment of the ITS 10, the clavicle simulation pad 50 is a generally rectangle shape that is sized to completely cover the orifice 24 and extend out radially from the orifice 24 approximately one inch in all directions so as to lay flush against the outer surface of the sidewall 14 proximate the orifice 24. The clavicle simulation pad 50 is formed from an elastic material, such as for example a TPE plastic or a latex or a silicone-based material, which is approximately three inches long, 1½ inches wide and a uniform thickness of approximately 0.060 inches. Of course, the dimensions of the clavicle simulation pad 50 can vary so long as the pad 50 maintains its similarity to human clavicle tissue and can be held in place over the orifice 24, particularly during needle decompression insertion training using the ITS 10. Adhesives or other bonding agents may be used to secure the clavicle simulation pad 50 to the outer surface of the sidewall 14.

In various embodiments, the improved ITS 10 further includes a generally rectangular simulated flesh pad 52 disposed on the outer surface of the body sidewall 14, over the clavicle simulation pad 50 and between the plane defined by the legs 30, 42 and 46 at one end of the body 12 and the plane defined by the legs 31, 43 and 47 at the other end of the body 12. The simulated flesh pad 52 is structured and functional to simulate the density and pliability of human flesh adjacent, for example, the simulated blood vessel in a human forearm or hand, and in particular subcutaneous tissue. The flesh pad 52 is formed from an elastic material, such as for example a foam, neoprene or rubber, and is sized to fit between the lips 15a and 15b of the body 12 with a length of approximately four inches, a width of approximately three inches, and a uniform thickness of approximately ⅜ inches. Adhesives or other bonding agents may be used to secure the flesh pad 52 to the outer surface of the sidewall 14. Of course, the dimensions of the flesh pad 52 can vary so long as the flesh pad 52 maintains its similarity to human subcutaneous tissue and can be held in place over the orifice 24, particularly during needle insertion training using the ITS 10. Adhesives or other bonding agents may be used to secure the flesh pad 52 to the outer surface of the sidewall 14.

With further reference to FIGS. 1, 2, and 3, the improved ITS 10 further includes one or more simulated blood vessels such as the simulated blood vessel strip or segment 54a or the simulated blood vessel tubing 54b (collectively, 54) disposed over the outer surface of the body 12. Each simulated blood vessel 54 is an elastomeric tube, or tubing, constructed of a suitable material, e.g., rubber or other elastic polymer or compound, sized and structured to simulate the feel, density, thickness and pliability of a human blood vessel. As described further below, each simulated blood vessel 54 is structured and operable to simulate a human blood vessel such that a user of the improved ITS 10 can practice the proper technique of inserting a catheter intravenous needle into an actual human blood vessel. Each simulated blood vessel 54 positioned on the ITS 10 is oriented laterally across the length of the sidewall 14 atop the flesh pad 52, with one end held in place in one of the slots 25 and at the other end held in place in the corresponding slot 28, as shown. The simulated blood vessels 54 can be of different configurations.

Where the simulated blood vessel 54 is an open-ended length of tubing (such as is shown by way of example at 54b in FIG. 1), a pair of clamps or clips 55 (preferably tube clips such as those shown by way of example in FIG. 1) are firmly attached along the length of the simulated blood vessel 54b such that the clips 55 will not slip. Alternatively, a portion of the simulated blood vessel 54b can be utilized by forming a knot along the length of the tubing at one or more desired locations. Preferably, however, the clips 55 are utilized and are separated by a section of the simulated blood vessel 54b that is somewhat less than the length between the slots 25 and 28 such that the section of the simulated blood vessel 54b between the clips 55 can be stretched, positioned over the flesh pad 52, and the clips 55 situated in the cavity 20 of the body 12 adjacent the slots 25 and 28. Methodically, one of the clips 55 is positioned in the cavity 20 adjacent one of the slots 25 or 28 with the section of the simulated blood vessel 54b between the clips 55 extending through the slot. The section of the simulated blood vessel 54b between the clips 55 is stretched over the flesh pad 52 and extended to allow the second clip 55 to slide into the open end of the opposing slot 25 or 28. The simulated blood vessel 54b is then allowed to snap into place over the flesh pad 52 with one of the clips 55 in the cavity 20 adjacent the slot 25, the other clip 55 in the cavity 20 adjacent the slot 28, and the simulated blood vessel 54b pulled taut through the closed ends of the slots 25 and 28.

Where the simulated blood vessel 54 is a simulated blood vessel strip or segment (such as is shown by way of example at 54a in FIGS. 1 and 5), each of the simulated blood vessels 54a comprises a length of elastomeric tubing having a length that is the same as or somewhat less than the length between the slots 25 and 28, and having enlarged ends 80 formed by the insertion of a plug 82 into each end of the simulated blood vessels 54a such that the elastic tubing stretches tightly over the plugs 82 to hold them securely in place. (See FIG. 5). To secure a simulated blood vessel 54a to the ITS 10, one of the enlarged ends 80 of the simulated blood vessel 54a is positioned in the cavity 20 adjacent one of the slots 25 or 28 with the section of the greater length of the simulated blood vessel 54a extending through the slot. The simulated blood vessel 54a is then stretched over the flesh pad 52 and extended to allow the other enlarged end 80 to slide into the open end of the opposing slot 25 or 28, the slot 25 or 28 thereby cinching and securing the enlarged end 80 of the simulated blood vessel 54a. The simulated blood vessel 54a is then allowed to snap into place over the flesh pad 52 with one of the enlarged ends 80 in the cavity 20 adjacent the slot 25, the other enlarged end 80 in the cavity 20 adjacent the slot 28, and the simulated blood vessel 54a pulled taut through the closed ends of the slots 25 and 28. One of ordinary skill in the art will recognize that the enlarged ends 80 of the simulated blood vessels 54a must each be of sufficient size to prevent the enlarged end 80 from passing through its corresponding slot 25 or 28.

Each of the simulated blood vessels 54, whether 54a or 54b or other configuration of the simulated blood vessels 54, can be empty or filled with either unpressurized or pressurized fluid, such as for example simulated blood. A simulated blood vessel 54 that is filled with a fluid is sometimes referred to as a "charged" vein or vessel. Therefore, if a user properly inserts a needle into an unpressurized charged simulated blood vessel 54, the user can draw, or extract, some or all of the liquid from the simulated blood vessel 54. Further, if a user properly inserts an intravenous needle into a pressurized charged simulated blood vessel 54, the simulated blood vessel 54 will provide a "flash" of simulated blood into the housing of the intravenous needle to indicate a proper wet vein insertion or "wet stick" for training purposes.

In a preferred configuration, for example, the ITS 10 includes two empty simulated blood vessels 54 positioned generally adjacent and on each of the long sides of the orifice 24 to act as touch indicators to simulate human ribs on either side of the intercostal tissue pad 50 for needle decompression insertion training, and a single charged simulated blood vessel 54 in the third position of the ITS 10 for wet-stick training (see FIGS. 2 and 3). For example, in various implementations, the simulated blood vessels 54 adjacent the orifice 24 can simulate the second and third ribs of a human torso skeletal structure. Still further, in various embodiments, the improved ITS 10 can include an inflatable air sack (not shown) structured and operable to be inflated and placed into the cavity 20 adjacent the needle decompression training orifice 24. Therefore, if a user properly inserts the needle of a decompression syringe into the needle decompression training orifice 24, simulating proper insertion of the needle into the chest cavity of a patient, the air sack will be pierced and the air can be evacuated via the decompression syringe, as described in detail below.

Additionally, in various embodiments, the improved ITS 10 includes an improved simulated skin patch 56 disposed over the outer surface of the body sidewall 14 over the simulated blood vessel(s) 54 and the flesh pad 52 (FIGS. 1-3). The simulated skin patch 56 is structured and functional to simulate the characteristics of human skin adjacent or in close proximity to the simulated blood vessels in a human forearm or hand. The skin patch 56 is formed from a supple elastic material, such as for example a TPE plastic or a latex or a silicone-based material, and is sized to fit substantially taut over the flesh pad 52 and between the legs 42, 43, 46 and 47 when slightly stretched (see FIGS. 2 and 3).

Referring to FIGS. 12 and 13, it can be seen that when laid flat in a relaxed state (i.e., not stretched), the improved skin patch 56 is substantially rectangular, having a central portion 58 with dimensions of approximately 4½ inches in length, 3 inches in width and 0.020-0.040 inches in thickness. The central portion has a first face 60 and a second face 62 opposite the first face 60. The first face 60 is textured to replicate the surface texture of human skin. A generally uniform ⅜ inch wide border 64 extends from and surrounds the central portion 58. The border 64 has a ⅛ inch wide flat portion 66 and a tapered portion 68 positioned between the flat portion 66 and the central portion 58 of the skin patch 56. At its interface with the central portion 58, the tapered portion 68 has a thickness approximately the same thickness as the central portion 58. The tapered portion 68 uniformly expands in thickness to its interface with the flat portion 66 of the border 64, where the thickness of the tapered portion 68 matches that of the flat portion 66.

A substantially flat and circular tab 70 extends at a 45 degree angle away from each of the four corners of the flat portion 66 of the border 64. The tab 70 has the same width and thickness as the flat portion 58, and defines a ⅛ inch wide circular aperture 72 in the center of the tab 70. The tabs 70 provide strengthened attachment loops that releasably secure the skin patch 56 to the legs 42 and 43 at one end and the legs 46 and 47 at the other end when the skin 56 is stretched over the flesh pad 52 atop the sidewall 14 (FIGS. 1-3). Hence, in addition to providing multiple bases for operation and use of the improved ITS 10, the legs 30, 31, 42, 43, 46 and 47, also provide mounting sites or positions for the skin patch 56. That is, the legs 30, 31, 42, 43, 46 and 47, simultaneously act as both legs for the stable utilization of the ITS 10, and also provide mounts for the skin patch 56.

In various alternate embodiments, including for example the ITS 100 in FIGS. 8-11, each simulated blood vessel 54b has opposing ends that are inserted through a respective pair of circular orifices or apertures 102 and 104 formed in the sidewall 14 near the closed and open ends 16 and 18 of the body 12. More particularly, the ends of the each simulated blood vessel 54b extend through the respective apertures 102 and 104 into the interior cavity 20 where the ends are secured, via any suitable securing means, e.g., a clamp or clip or knot, such that at least a portion of each simulated blood vessel 54b between the respective ends is disposed along the outside of the outer surface of the body sidewall 14. Accordingly, the portion of each simulated blood vessel 54b disposed along the outside of the outer surface of the body sidewall 14 is accessible by the user for use in practicing the proper technique of inserting a catheter intravenous needle into an actual human blood vessel, as described further below.

In various embodiments, each simulated blood vessel 54 has a length such that a supplementary portion of each simulated blood vessel 54b is disposed within the interior cavity 20 to provide additional simulated vein material for replacing the portion of each simulated blood vessel 54b disposed along the outside of the outer surface of the body sidewall 14. That is, as the portion of each simulated blood vessel 54b disposed along the outside of the outer surface of the body sidewall 14 deteriorates from use or is otherwise damaged, the securing means of one end of the respective simulated blood vessel 54b can be released and the deteriorated portion can be pulled into the interior cavity 20 or alternatively removed and discarded. Simultaneously, the supplementary portion of the respective simulated blood vessel 54b can be pulled to the outside of the body 12 and disposed along the outer surface of the body sidewall 14, thereby replacing the deteriorated portion.

The ITS 100 also incorporates a set of six removable pegs 106 that snap securely into orifices 108 to form legs for the device. This may be desirable on a number of levels. For example, when the body 12 is machined, such as for example from a rigid materials such as for example aluminum or a plastic, constructing integrated legs into the body 12 as part of the machining process would be difficult and expensive. In addition, it may prove advantageous to be able to remove the legs from the body 12 for shipping or storage. The orifices 108 correspond to the same positions and orientations as, that is to say they mimic, the positions and orientations of the legs 30, 31, 42, 43, 46 and 47, with respect to the body 12. The pegs 106 are formed of a generally rigid, yet pliant plastic, with a plaint prong 110 at one end that has a diameter that is slightly greater than the diameter of the orifices 108 for secure insertion into the orifices 108, and a bulbous knob 112 at the opposite end to hold the tabs 70 onto the pegs 106 when the skin patch 56 is stretched into place on the ITS 100.

Operation and use of the improved ITS 10 will now be described. As described above, the improved ITS 10 can be utilized to simulate "dry stick" intravenous needle insertion. For example, in various embodiments, one or more of the simulated blood vessels 54 of the improved ITS 10 can be utilized to practice inserting an IV needle and advancing an associated catheter into any of the empty simulated blood vessels 54 properly mounted to the outer surface of the ITS 10. To perform such a dry intravenous needle insertion training procedure utilizing the improved ITS 10, the user removes at least one of the endcaps 22 from the body 12 and removes the desired Storable Trainer Component, e.g., an 18 gauge catheter needle, saline lock and custom IV line, from the interior cavity 20. The user may then re-secure the endcap 22 to body 12 to close the improved ITS 10.

Next, the user chooses which of the practice faces will be used for training and positions the appropriate legs (i.e., 30, 31, 42 and 43; or alternatively, 30, 31, 46 and 47) of the improved ITS 10 on an upward facing surface so that the desired training orientation of the ITS 10 is achieved and the desired training area or region is facing upward. The user will then complete a pre-execution check of the IV supplies, e.g., the 18 gauge catheter needle, saline lock and custom IV line, to ensure good serviceability, and place them within reach.

Subsequently, the user can employ one or more of the proper needle insertion techniques, such as follows: the user holds the needle between his/her index finger and thumb and removes a safety cap from the needle. With the opposite hand, using his/her thumb and index finger, the user forms the letter "C" and positions his/her index finger over the selected simulated blood vessel 54 and above the injection site, (this will keep the simulated blood vessel 54 from rolling and act as a pressure point to slow blood loss from an actual needle insertion, once the needle is removed). The user then positions his/her thumb below the injection site and applies a small amount of downward tension pulling the simulated skin patch 56 taunt. The thumb may also be used as a support for the needle to ensure a 45° angle. Next, the user positions the needle at approximately a 45° angle with the bevel edge of the needle facing upward and slowly inserts the needle into the simulated blood vessel 54. Due to the construction of the simulated blood vessels 54, the user will feel a small amount of resistance as the needle advances through the simulated skin patch 56 and the wall of the simulated blood vessel 54. Once the needle is properly inserted, the user repositions his/her thumb to allow the needle to drop down to above the skin level. Next, the user slowly advances the needle approximately another ¼ of an inch into the simulated blood vessel 54. Without moving the needle, the user slowly advances the catheter into the simulated blood vessel 54. Next, while continuing to apply pressure with his/her index finger above the injection site, the user removes the needle, leaving the catheter in place.

As also described above, the improved ITS 10 can be utilized to simulate "wet stick" intravenous needle insertion. For example, in various embodiments, one or more of the simulated blood vessels 54 of the improved ITS 10 can be filled with a liquid, as described above, and be utilized to practice inserting an IV needle and obtaining an actual "flash" of blood in the needle chamber. Using a charged simulated blood vessel 54, the user will employ the same steps as described above for dry stick intravenous needle insertion training. However, if the needle is properly inserted into the liquid filled simulated blood vessel 54, the user will see a "flash" of liquid in the chamber of the intravenous needle chamber (or associated syringe if a syringe is being used), simulating a "flash" of blood into the needle chamber during an actual wet intravenous needle insertion.

As further described above, the improved ITS 10 can be utilized to perform needle decompression training. To perform such needle decompression training, the user places the endcap 22 in the open position and removes the desired Storable Trainer Components, e.g., a decompression syringe and a 14 gauge catheter needle, from the interior cavity 20, as described above. In various implementations, the user can next inflate an air sack and insert the air sack into the interior cavity 20 beneath the needle depression training orifice 24. The user may then resecure the endcap 22 to close the body 12 of the improved ITS 10.

Next, the user positions the appropriate legs (i.e., 30, 31, 42 and 43) of the improved ITS 10 on an upward facing surface so that the desired training orientation of the ITS 10 is achieved with the needle decompression training area or region is facing upward. The user will then complete a pre-execution check of the IV supplies, e.g., the 14 gauge catheter needle, air sack, etc., to ensure good serviceability, and place them within reach. Using his/her fingers to feel along the skin patch 56 and flesh pad 52 at each side of the orifice 24, the user then identifies the proper insertion site between the two adjacent simulated blood vessel 54 adjacent the orifice 24, to simulate locating the middle of a human clavicle between the second and third ribs. Subsequently, the user removes the safety cap from the 14 gauge needle and holds the needle at approximately a 90° angle to the injection site, i.e., above the needle depression training orifice 24. Then, applying firm, but gentle, pressure the user advances the needle through the simulated skin patch 56 and flesh pad 52. The user continues to advance the needle until the catheter hub is against the simulated skin patch 56. Then, while holding the catheter needle in place, the user removes the needle, and can optionally secure the catheter hub in place with tape and attach a small flutter valve to the hub of the catheter. Decompression can then be verified by checking the air sack to determine whether the air from within the air sack has been evacuated.

While I have described in the detailed description several configurations that may be encompassed within the disclosed embodiments of this invention, numerous other alternative configurations, that would now be apparent to one of ordinary skill in the art, may be designed and constructed within the bounds of my invention as set forth in the claims. Moreover, the above-described novel mechanisms of the present invention, shown by way of example at 10 can be arranged in a number of other and related varieties of configurations without departing from or expanding beyond the scope of my invention as set forth in the claims. Thus, the description herein is merely exemplary in nature and, thus, variations that do not depart from the gist of that which is described are intended to be within the scope of the teachings. Such variations are not to be regarded as a departure from the spirit and scope of the teachings.

For example, the improved ITS 10 is not limited to two training areas as depicted by representation in the Figs. Rather, the improved ITS 10 may incorporate three or more such training areas and the legs may be modified or the number increased to provide an opposing stable base, oriented on the opposite side of the body 12, for at least two of the three or more training areas. Similarly, the improved ITS 10 is not restricted to an exact count of six legs. Rather, the number of legs and their shapes and sizes may vary substantially so long as the legs collectively provide an opposing stable base, oriented on the opposite side of the body 12, for each of the training areas, and preferably share at least one common support or leg for at least two training areas.

The slots 25 and 28 may be of various shapes and dimensions, need not be uniform and need not be open-ended, so long as the slots can readily allow for the insertion of the enlarged end 80 of the simulated blood vessel strip or segment 54*a* into the slot such that the enlarged end 80 will remain secure in the slot once both ends of the simulated blood vessel 54*a* are in opposing slots and the simulated blood vessel 54*a* is released. For example, the slot may be closed and have a keyhole shape in which the enlarged end 80 of the simulated blood vessel 54*a* can pass through the large opening in the keyhole slot but not the reduced or cinched opening in the slot.

The skin patch 56 may have alternate shapes and sizes so long as the skin patch 56 reasonably simulates at least in part human skin in region of the training area, and can be secured to the body 12 by attachment to one or more of the legs or upward supports for the body 12, such as for example one or more of the legs 30, 31, 42, 43, 46 and/or 47. For example, the perimeter of the skin patch 56 may be oval, round, square, or randomly shaped; the circular tab 70 and circular aperture 72 need not be circular nor the exact size described above, but can rather be any of a variety of other shapes and sizes, and can include one or more attachment mechanisms such as for example, a hook, a loop, a latch, a button, a grip, a tie or a clamp, so long as the skin patch 56 can be secured to the body 12 by attachment to one or more of the legs or upward supports for the body 12 using one or more of said attachment mechanisms. Further, the skin patch 56 does not require a border, nor a uniformly dimensioned border, nor a border identical to the border 64. Instead, the border 64 of the skin patch 56 may be configured to have one or more of a variety of shapes and sizes, or the skin patch 56 may have no border at all. The central portion of the skin patch 56 need not be entirely uniform in thickness as described above, but may vary in thickness substantially, particularly in light of the potential use of different materials and processes to form the skin patch 56, so long as the skin patch 56 reasonably simulates at least in part human skin in region of the training area and provides reasonable durability.

Moreover, each of the features of the improved ITS 10 described herein may be utilized in conjunction with or incorporated into various medical insertion training devices and systems that are not self-contained as claimed in the '634 Trainer.

Additional variations or modifications to the configuration of the novel mechanism of the present invention, shown by way of example at 10, may occur to those skilled in the art upon reviewing the subject matter of this invention. Such variations, if within the spirit of this disclosure, are intended to be encompassed within the scope of this invention. The description of the embodiments as set forth herein, and as shown in the drawings, is provided for illustrative purposes only and, unless otherwise expressly set forth, is not intended to limit the scope of the claims, which set forth the metes and bounds of my invention. Accordingly, all matter contained in the above description or shown in the accompanying drawings should be interpreted as illustrative and not in a limiting sense.

What is claimed is:

1. A medical needle insertion training system comprising a training device and a synthetic skin patch, wherein said training device comprises a training region and a plurality of fastening structures positioned proximate said training region, wherein at least one of said plurality of fastening structures on said training device comprises a leg, said leg being adapted to support said training device on a working surface, and wherein the skin patch comprises:
   a. a substantially flat central body; and
   b. a plurality of connectors positioned generally about the perimeter of said central body, said plurality of connectors positionally oriented to enable the mating for attachment of said plurality of connectors to a corresponding plurality of fastening structures on said training device proximate said training device training region, said plurality of connectors securing at least in part said skin patch to said training device, such that said central body at least in part contacts said training device and at least in part covers said training region.

2. The medical needle insertion training system of claim 1, wherein said skin patch comprises an elastic portion, and two of said plurality of connectors are oriented to mate with two of said plurality of fastening structures on said training device, said two of said plurality of connectors being positioned on said skin patch so as to require said elastic portion of said skin patch to stretch in order for said two of said plurality of connectors to attach to their respective said two of said plurality of fastening structures.

3. The medical needle insertion training system of claim 2, wherein at least one of said central body and one of said plurality of connectors is at least in part elastic.

4. The medical needle insertion training system of claim 3, wherein said central body and said plurality of connectors are at least in part elastic.

5. The medical needle insertion training system of claim 1, wherein at least one of said plurality of connectors comprises a hoop, a hook, a latch, a button, a grip, a tie, a tab, a clamp, or an opening in said the patch.

6. The medical needle insertion training system of claim 1, wherein at least one of said plurality of fastening structures comprises one of a rigid portion and a protruding portion that extends at least in part outward from said training device, and at least one of said plurality of connectors attaches to said one of said rigid portion and said protruding portion.

7. The medical needle insertion training system of claim 1, wherein said central body has a first face and a second face opposite said first face, said first face being textured, at least in part, to replicate the surface texture of human skin.

8. The medical needle insertion training system of claim 1, wherein said training device is adapted for placement of a simulated blood vessel across said training region and said skin patch central body covers at least in part said blood vessel when said skin patch is secured to said training device.

9. The medical needle insertion training system of claim 1, further comprising a border region positioned at least in part about said central body, said border region having an average thickness, said central body having an average thickness, said border region average thickness being different from said central body average thickness.

10. A medical needle insertion training system comprising a training device and a synthetic skin patch, said training device having a training region, said system comprising:
   a. a plurality of fastening structures positioned about said training region, wherein at least one of said plurality of fastening structures on said training device comprises a leg, said leg being adapted to support said training device on a working surface;

b. a skin patch, said skin patch comprising a substantially flat central body, and a plurality of connectors positioned about the perimeter of said central body, said plurality of connectors positionally oriented for mating and attachment to said plurality of fastening structures on said training device to secure at least a portion of said central body against said training device, at least a portion of said central body covering at least in part said training region.

11. The medical needle insertion training system of claim 10, wherein at least one of said plurality of connectors extends radially from said central body.

12. The medical needle insertion training system of claim 10, wherein said training device is adapted for placement of a simulated blood vessel across said training region and said skin patch central body covers at least in part said blood vessel when said skin patch is secured to said training device.

13. The medical needle insertion training system of claim 10, wherein said skin patch comprises an elastic portion, and two of said plurality of connectors are oriented to mate with two of plurality of fastening structures on said training device, said two of said plurality of connectors being positioned on said skin patch so as to require said elastic portion of said skin patch to stretch in order for said two of said plurality of connectors to attach to their respective said two of said plurality of fastening structures.

14. The medical needle insertion training system of claim 10, wherein said skin patch comprises a border region positioned at least in part about said central body, said border region having an average thickness, said central body having an average thickness, said border region average thickness being different from said central body average thickness.

15. The medical needle insertion training system of claim 10, wherein said skin patch central body has a first face and a second face opposite said first face, said first face being textured, at least in part, to replicate the surface texture of human skin.

16. The medical needle insertion training system of claim 10, wherein at least one of said plurality of fastening structures on said training device comprises one of a rigid portion and a protruding portion that extends at least in part outward from said training device, and at least one of said skin patch plurality of connectors attaches to one of said rigid portion and said protruding portion.

17. The medical needle insertion training system of claim 10, wherein at least one of said central body and one of said plurality of connectors is at least in part elastic.

18. The medical needle insertion training system of claim 17, wherein said central body and said plurality of connectors are both at least in part elastic.

* * * * *